United States Patent Office 2,933,062
Patented Apr. 19, 1960

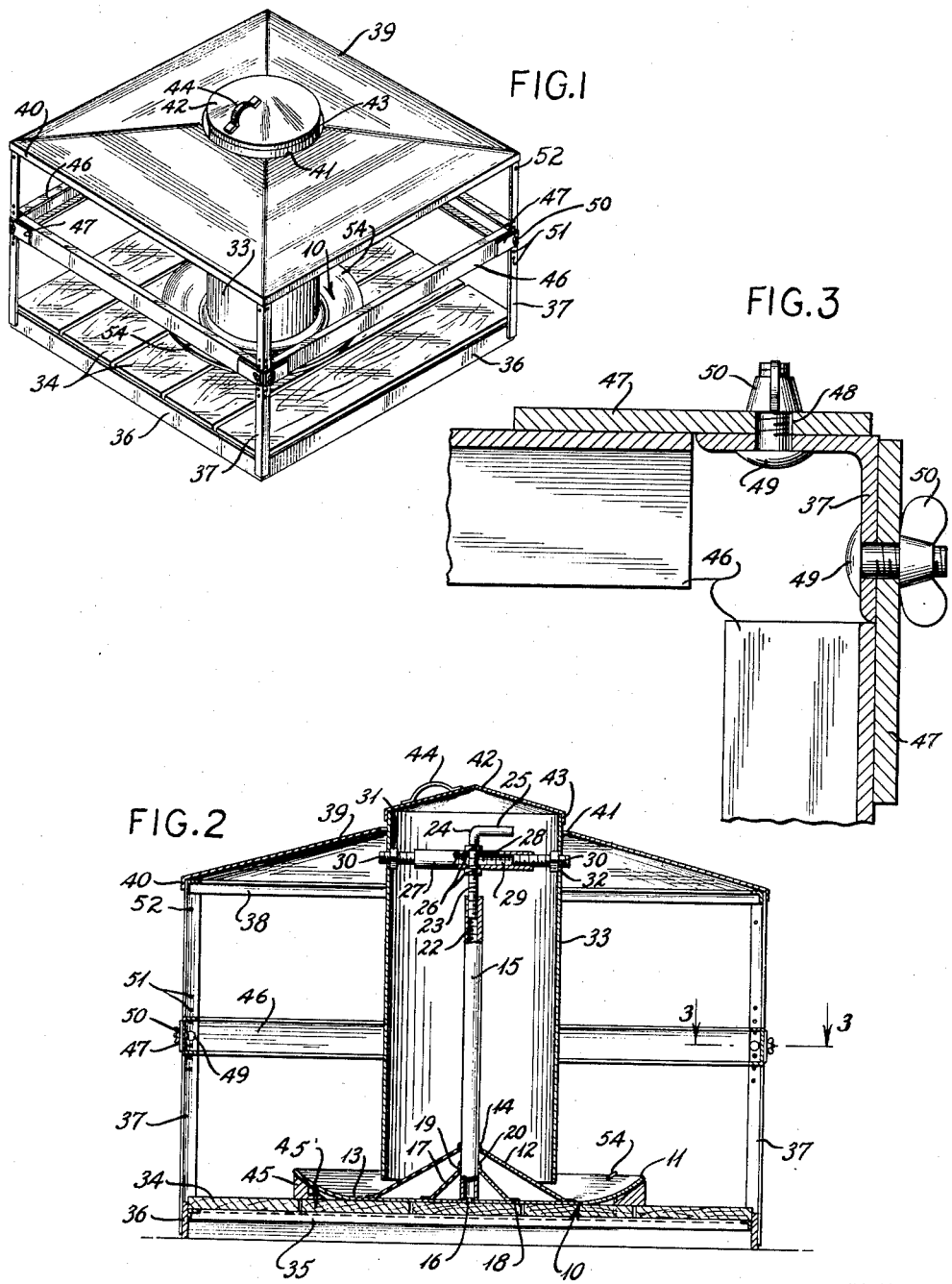

2,933,062
HOG FEEDER WITH CANOPY

Petrus J. Geerlings, Waterloo, Iowa

Application December 9, 1958, Serial No. 779,079

9 Claims. (Cl. 119—52)

This invention relates to the feeding of livestock and the equipment employed by which it is desired to maintain a supply of feed available at all times without the necessity of an attendant being present.

The invention is directed to a structure by which a barrel, drum or other generally cylindrical container is converted into an animal feeder of few simple and less expensive parts therefore more readily available to the consumer and with the addition of a floor, a roof and adjustable side bars to exclude larger animals.

Feeders heretofore in use have been exposed to the elements and lacked protection from larger animals so that they could be turned over and pushed around, not having obtained the degree of development desired for an ideal feeder.

It is an object of the invention to provide an improved feeder of simple and inexpensive construction supported on a floor, protected by a roof, of a sufficient size not to be easily pushed around, and with barriers to larger animals, adjustable to make it possible to control at least to a degree the size of the animals obtaining feed from the feeder.

Other objects and advantages of the invention will be apparent from the following description taken in conjunction with the accompanying drawing wherein:

Fig. 1 is a perspective illustrating one application of the invention;

Fig. 2, a vertical section; and

Fig. 3, an enlarged fragmentary detail on the line 3—3 of Fig. 2.

Briefly stated, the feeder of the present invention employs a feed cylinder having a removable cover for its upper end and with its lower end open, such cylinder being supported near its upper end by means of a cross bar adjustably mounted on a central post to vary the spacing of the bottom of the cylinder from a feeding trough mounted centrally on a square floor, corner posts being provided which support a canopy or roof and with vertically adjustable side bars forming a hindrance to animals of a certain size and excluding others.

With continued reference to the drawing the feeder of the present invention comprises a base or trough 10 having a raised rim 11 and a raised center portion 12 forming an annular feeding trough or channel 13 between the same.

The raised center portion 12 may be an independent frusto-conical member secured by spaced welds 14 around the rim of the raised center portion. A post 15 is mounted centrally on the base 10 and the latter may have an instruck portion 16 for centering the post on the base. An additional frusto-conical member 17 may be disposed within the member 12 for providing an additional support between the base and the post, the member 17 being adapted to be secured in place by welds 18. The member 17 also may have a sleeve or collar 19 which fits snugly around the post 15 and may be secured thereto by one or more welds 20.

The post 15 has an internally threaded upper end 22 for the reception of an externally threaded end 23 of an adjustable L-shape operating extension 24, the upper right angular portion 25 of which serves as a handle to facilitate rotation and relative adjustment between the members 15 and 24 by means of the threads 22 and 23. A pair of nuts 26 are mounted on the threaded end 23 of the member 24 to form limit stops for a cross arm 27 having a transverse opening 28 in which the extension 24 is loosely received so that the cross arm 27 may tilt and move vertically a limited amount.

The cross arm 27 is provided with internal threads 29 and in each end of the cross arm is received an externally threaded stud 30 having a nut 31 thereon. The studs 30 are adjustable relative to the internally threaded cross arm 27 so that they may extend through diametrically opposed openings 32 in a cylinder 33 near one end of the same in order to support the cylinder solely from the cross arm 27 on the post or central member 15.

It will be apparent that the structure described provides a feeder in which a cylinder or sleeve is supported near its upper end with its lower end in spaced relation to a trough and that such sleeve may be obtained from a drum, barrel or the like found on the farm to keep the cost at a minimum. When the parts are assembled and the sleeve is suspended its lower end can swing in all directions to facilitate discharge of feed from such lower end occasioned by movement caused by hogs or other animals consuming the feed and the amount of feed discharge will be determined by the amount of swinging of the cylinder.

A floor 34 is mounted on sills 35 of angle iron or the like within a rectangular frame 36. At each corner an angle iron post 37 is provided for supporting a roof frame 38 on which is mounted a canopy or roof 39 having a marginal flange 40 and a central opening 41 in which the upper end of the feed cylinder 33 is disposed. A cover 42 is provided over the cylinder 33 having a marginal flange 43 and a handle 44 by which the cover may be removed and replaced.

On account of the cylinder 33 being located in the opening 41 in the roof or canopy 39 the feeder will tend to remain in the center of the floor 34. If desired, a centering ring 45 may be provided on the floor for such purpose and such ring 45 may be secured to the floor 34 by means of screws 45'. The trough 10 may be fastened to the floor by means of hooks 54, each hook having an end driven or threaded into the floor, two of such hooks being arranged in diametrically opposed relation or, if desired, additional hooks may be employed.

Due to the height of the posts 37 and the canopy or roof 39 only animals of a certain size can have access to the feeder and to further control this an adjustable bar 46 may be provided at each side, each bar being provided with an end bracket 47 having an opening 48 for a bolt 49 and a wing nut 50 by which the bars may be secured to the posts 37 with the bolt 49 in one of a series of openings 51 in each post by which the height of the bar can be varied. The bars 46, when supported in intermediate position, provide a barrier for animals of a particular size, smaller animals being able to reach the feeder beneath such bars. In other words, if the animals are sufficiently large, they are excluded and if they are sufficiently small, they have access. The bars 46 may be supported out of the way near the top of the feeder and for this purpose additional openings 52 may be provided near the top of the posts 37. When the bars are mounted in the upper position, the larger animals have access to the feeder and the bars 46 are in a position to give added protection from the elements to help keep rain and snow out of the trough 13.

It will be apparent that the feeder of the present invention is a relatively low flat structure with a flat bottom of wood, metal or other material so that it cannot be easily overturned and with an arched top so that if overturned by a large animal and struck with sufficient force it will right itself. Means is provided for supplying feed in accordance with the demand and the size of the animals feeding can be controlled by the use of one or more bars 46 on each side, the entire structure being relatively simple and inexpensive to produce as well as a practical device for supplying feed to livestock.

It will be obvious to those skilled in the art that various changes may be made in the invention without departing from the spirit and scope thereof and therefore the invention is not limited by that which is shown in the drawings and described in the specification but only as indicated in the accompanying claims.

What is claimed is:

1. In a hog feeder designed for ready assembly on location and for maximum sanitation, spaced supporting sills, a floor mounted on said sills and providing a substantially rectangular structure, an angle iron supporting post fitted about each corner of said supporting structure and being bolted thereto, an upright feeder disposed centrally of said supporting structure between said corner posts, a roof forming canopy about the upper end of said feeder and mounted on said corner posts, side bars mounted between adjacent corner posts and adjustable as to height and providing an obstruction for animals, the height of said canopy and said side bars affecting the use of said feeder to the extent that larger animals can be excluded thus permitting the use of the container and associated parts of lighter weight and requiring less force to agitate to cause the discharge of feed therefrom.

2. A feeder of the character described designed for ready assembly on location and for maximum sanitation comprising a floor, supporting posts extending upwardly from said floor, bars adjustably supported between said posts whereby larger animals can be excluded thus permitting the use within the interior of the device of parts of lighter weight, a roof forming canopy having a central opening, a feeder mounted on said floor within said central opening, said feeder comprising a shell supported adjacent its upper end and having its lower end adjacent said floor and with its lower end movable during the consumption of feed to cause the additional discharge of feed therefrom.

3. A feeder of the character described designed for ready assembly on location and for maximum sanitation comprising a floor, supporting posts extending upwardly from said floor, bars adjustably supported between said posts, a feeder mounted on said floor, said feeder comprising a shell supported adjacent its upper end and having its lower end adjacent said floor and with its lower end movable during the consumption of feed to cause the additional discharge of feed therefrom.

4. A feeder comprising a supporting floor, a canopy supported above said floor, a feed trough located centrally of said floor, a feed cylinder mounted above said feed trough for the discharge of feed thereinto, the lower end of said cylinder being open and movable by animals feeding therefrom, and restraining bars about said feed cylinder for impeding access to said trough.

5. In a hog feeder a base forming a floor, spaced upright supports about said floor, a roof mounted on said supports and side bars adjustably mounted between said posts and providing an obstruction for animals of a certain size, an upright feeder disposed centrally on said floor, said feeder being mounted so that its lower end is movable by the action of the livestock in feeding to discharge the contents thereof.

6. A device for converting a barrel, drum or other generally cylindrical container into an animal feeder comprising a base having an annular trough forming portion with an upright post mounted centrally on such base, means defining an outwardly and downwardly inclined surface about said post for deflecting feed outwardly from said post, said post having a threaded extension at its upper end with a laterally disposed portion serving as a crank by which said extension can be moved vertically on said post to vary its height, a transverse support comprising a central member and a pair of relatively adjustable and cylinder engaging members for varying the length of said transverse support to accommodate cylinders of different diameters, the connection between the extension of said post and said transverse support being relatively loose to permit movement of the lower end of the cylinder when engaged by animals and by such movement to cause discharge of feed therefrom.

7. A device for converting a barrel, drum or other generally cylindrical container into an animal feeder comprising a base having an annular trough forming portion with an upright post mounted centrally on such base, means defining an outwardly and downwardly inclined surface about said post for deflecting feed outwardly of said post into said feed trough, a transverse longitudinally extensible support for engagement with and for supporting containers of different diameters, an adjustable connection between said upright post and said transverse support for adjusting the elevation of said transverse support and the cylinder carried by it in order to space said cylinder at the proper height relative to the trough, the adjustable connection between the upright post and transverse support being sufficiently loose to allow the lower end of the cylinder to be moved in all directions by feeding animals to cause the discharge of feed from said cylinder into said trough.

8. The structure of claim 7 including means adjustable with regard to said transverse support for engaging said cylinder and maintaining it in fixed relation relative to such transverse support.

9. An animal feeder comprising a trough-forming base, an upright post mounted on said base and having an adjustable extension on its upper end by which the height of the post can be varied, means providing an outwardly and downwardly inclined surface for directing feed outwardly from said post, a transverse support mounted on the upper portion of said post having outwardly adjustable cylinder-engaging members for varying the length of said transverse support to accommodate cylinders of varying diameters, a cylinder for feed carried about said post by said transverse support, the connection between said transverse support and said post being sufficiently loose to permit movement of the lower end of the cylinder when it is engaged by animals feeding from said trough in a manner to discharge said feed from said cylinder into said trough.

References Cited in the file of this patent

UNITED STATES PATENTS

| | | |
|---|---|---|
| 608,863 | Innis | Aug. 9, 1898 |
| 829,611 | Turner | Aug. 28, 1906 |
| 1,257,638 | Robbins | Feb. 26, 1918 |
| 1,468,205 | Julian | Sept. 18, 1923 |
| 2,701,549 | Jones | Feb. 8, 1955 |
| 2,863,419 | Murrell | Dec. 9, 1958 |